(12) United States Patent
Kohl et al.

(10) Patent No.: US 6,171,653 B1
(45) Date of Patent: Jan. 9, 2001

(54) APPARATUS FOR APPLYING A LIQUID OR VISCID COATING MEDIUM ONTO A MOVING FIBER MATERIAL WEB

(75) Inventors: Bernhard Kohl; Martin Kustermann, both of Heidenheim; Oswald Satzger, Giengen; Rüdiger Kurtz, Heidenheim; Harald Hess, Grünkraut; Karl-Heinz Hannen, Augsburg; Hans Peter Hoffmann, Dachau; Franz Kustos, Duisburg, all of (DE)

(73) Assignee: Voith Sulzer Papiertechnik Patent GmbH, Heidenheim (DE)

( * ) Notice: Under 35 U.S.C. 154(b), the term of this patent shall be extended for 0 days.

(21) Appl. No.: 09/229,090

(22) Filed: Jan. 8, 1999

(30) Foreign Application Priority Data

Jan. 13, 1998 (DE) .............................................. 198 00 955

(51) Int. Cl.⁷ ................................ B05D 3/02; B05D 1/40
(52) U.S. Cl. ........................ 427/377; 427/356; 427/358; 427/361; 427/398.4; 427/428; 427/211; 427/350
(58) Field of Search .................................... 427/356, 358, 427/361, 377, 398.1, 398.2, 398.4, 428, 211, 350

(56) References Cited

U.S. PATENT DOCUMENTS

| | | | |
|---|---|---|---|
| 3,152,918 | * 10/1964 | Kraus | 117/63 |
| 5,106,655 | * 4/1992 | Boissevain et al. | 427/296 |
| 5,454,870 | 10/1995 | Sieberth | 118/258 |
| 5,484,482 | * 1/1996 | Rantanen et al. | 118/203 |
| 5,567,479 | * 10/1996 | Rantanen | 427/359 |

FOREIGN PATENT DOCUMENTS

| | | | |
|---|---|---|---|
| 25 45 901 | 4/1976 | (DE) | B05D/1/26 |
| 18 17 912 | 12/1977 | (DE) | D06B/1/02 |
| 37 01 406 C2 | 10/1988 | (DE) | D21H/1/48 |
| 39 35 059 C1 | 2/1991 | (DE) | B05C/9/04 |
| 296 21 877 U1 | 3/1997 | (DE) | B05C/1/08 |

OTHER PUBLICATIONS

"TAPPI Metered Size Press Forum," by Dr. Hans W. Maurer, *Wochenblatt Für Papierfabrikation 17*, 1997, p. 827.

\* cited by examiner

*Primary Examiner*—Shrive Beck
*Assistant Examiner*—Jennifer Kolb
(74) *Attorney, Agent, or Firm*—Taylor & Aust, P.C.

(57) ABSTRACT

An apparatus applies a liquid or viscid coating medium onto a moving material web, especially one made of paper or cardboard. A coating mechanism first applies the coating medium onto an applicator element or an applicator roll, which subsequently transfers the coating medium at a coating location onto the material web in the form of a coating layer. Furthermore, if so desired, a doctoring device can be positioned at a doctor station, adjacent to the coating location, on the downstream side relative to the movement of the material web for the purpose of smoothing and/or metering the coating. The coating apparatus incorporates an apparatus for the generation and/or supplying of a fluid, preferably steam. This apparatus is positioned adjacent to the coating location or to the doctor station on the downstream side relative to the movement L of the material web.

10 Claims, 5 Drawing Sheets

APPARATUS FOR APPLYING A LIQUID OR VISCID COATING MEDIUM ONTO A MOVING FIBER MATERIAL WEB

BACKGROUND OF THE INVENTION

1. Field of the Invention

The present invention relates to an apparatus for applying a liquid or viscid coating medium onto a moving material web, especially one made of paper or cardboard.

2. Description of the Related Art

Figure 2A:
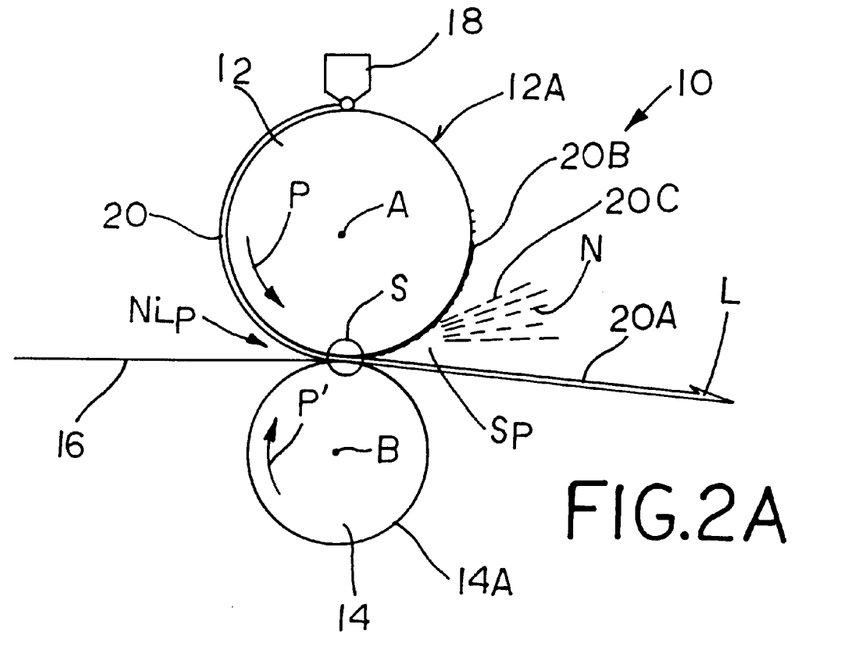
FIG. 2*a* is a side, schematic view of a coating apparatus, according to the state of the art.

An exemplification of a known apparatus for applying a liquid or viscid coating medium onto a moving material web is illustrated in FIG. 2a. The coating apparatus includes an applicator roll 12 and a counter roll 14. The two rolls, 12 and 14, form a nip through which material web 16 runs in the direction of feed. Applicator roll 12 is coated with a liquid or viscid coating medium by use of a coating mechanism 18. This medium is subsequently transferred onto the material web 16 in the area of the coating location S. Applicator roll 12 and counter roll 14 are driven in opposite directions around their respective axes A and B as indicated by arrows P and P'. Such coating apparatuses are applied, for example, in film coating processes, roll coating processes and size presses.

Coating apparatus 10 usually experiences problems in the area Sp—located adjacent to the coating location S, on the downstream side relative to the movement of the material web 16—as the material web 16 separates from the outer surface 12a of roll 12. The pre-metered coating of coating medium 20 being applied onto the outer surface 12a is only partially transferred in the nip onto the material web 16. A part 20b of the coating medium 20 adheres to the outer surface of roll 12, and therefore, returns back to the coating mechanism 18. Those experienced in the art, refer to this effect as "film splitting".

In the process of film splitting, "coating medium threads" F (FIG. 2b) develop between the coating medium 20 being applied onto the material web 16 and the remaining layer 20b of coating medium on roll 12—similar to the honey threads that are formed between a spoon that is pulled from a honey jar. When these threads F are torn, it is possible to develop droplets or particles 20c of the coating medium 20, which is reflected in the formation of spray mist N. Accordingly, it can be said that the spray mist is formed by the particles and droplets 20c of the coating medium 20, which, for example, are torn from the previously applied coating 20a by the adhesive force of applicator roll 12.

Figure 2B:
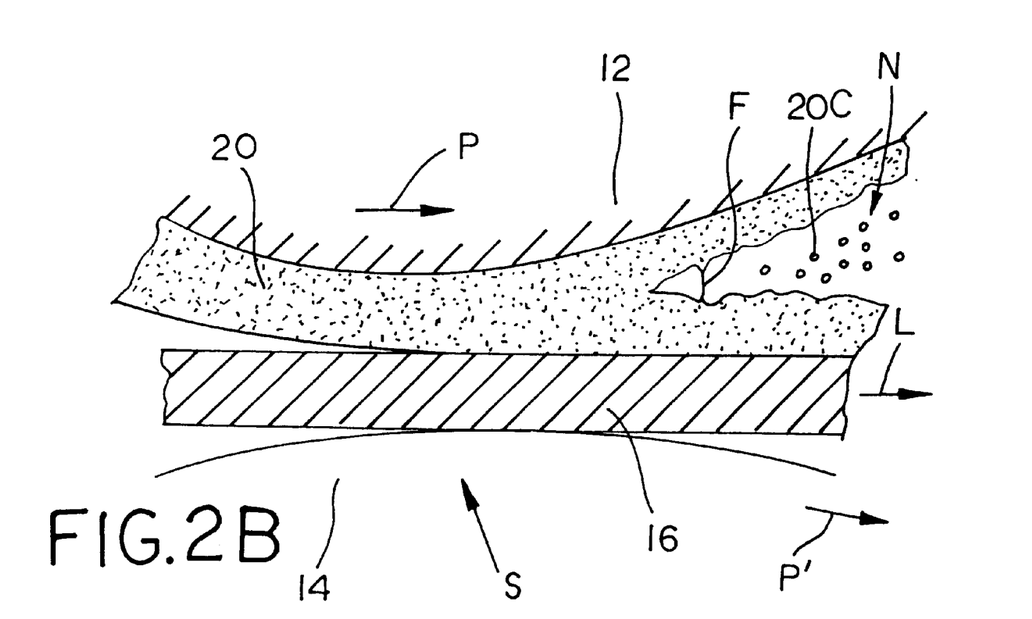
FIG. 2*b* is an enlarged view of coating location S of FIG. 2*a*.

Due to the aforementioned formation of the spray mist, the quality of the coated material web can be compromised in several ways. For example, small craters can form on the outer surface of the coated material web. Furthermore, the remaining parts of the torn-off coating medium threads F can cause a so-called "orange skin effect". Additionally, the re-deposit of droplets or particles 20c in an area removed from the spray area Sp can lead to an irregular structure of the material web's coating surface. The spray mist also causes other drawbacks such as a contamination of the coating apparatus.

The risk of encountering the above-stated disadvantages increases as the feed speed of the material web 16 increases, as the area specific coating weight on the material web 16 increases, and as the absorbency capability and/or the bibulousness of the material web 16 decreases. To avoid the aforementioned disadvantages of the state of the art, it was suggested in a summary report issued by the "Tappi Metered Size Press Forum" by Dr. Hans W. Maurer (weekly publication for paper manufacturing 17, 1997, page 827) to vary the composition of the coating medium. This approach, however, has proven to be impractical.

SUMMARY OF THE INVENTION

The present invention provides a coating apparatus of the type mentioned above, which eliminates the spray mist from the coating medium, or, at a minimum, reduces its adverse effects on the coating result, so that a uniform coating can be achieved.

A coating mechanism first applies the medium onto an applicator element or an applicator roll, which subsequently transfers the coating medium at a coating location onto the material web in the form of a coating layer, or it is entered into a coating sump, formed between the material web and a limiting element or limiting roll in which the coating medium is deposited onto the material web. If so desired, a doctoring device can be positioned at a doctor station, adjacent to the coating location, on the downstream side relative to the movement of the material web, for the purpose of smoothing and/or metering the coating.

This problem is solved by providing an apparatus to generate and/or supply fluid, preferably steam. The apparatus is positioned adjacent to the coating location or doctor station on the downstream side relative to the movement of the material web.

For the sake of simplicity, further elaboration of this invention will be conducted by using steam as the fluid that is being introduced in the area of the coating location. It is, however, understood that other fluids can also be successfully used, not only in the area of the coating location, but also in the area of a doctor station at which the coating is smoothed and/or metered by use of a roll doctor, which also has the tendency to develop spray mist.

In accordance to this invention, a device provided to surround the spray area Sp, located adjacent to coating location S on the downstream side relative to the movement L of the material web, with a steam-saturated atmosphere, preferably steam produced from water. This causes, on one hand, a reduction in the surface tension of the coating medium, which tends to favorably affect the thread and droplet formation. On the other hand, the steam-saturated atmosphere causes a slowing of the drying process of the coating medium, as well as the medium droplets that are being applied onto the material web, so that the structures on the coating that are being produced by tearing threads and droplets can bleed into the coating without leaving any marks. This results in a more uniform coating.

It has been proven to be advantageous to use steam that no longer absorbs any water, i.e., saturated and superheated steam.

Regardless of whether the steam is produced near the coating apparatus or whether the steam is produced in a remote area relative to the coating apparatus and subsequently piped to the spray area, it is desirable for the steam-generating apparatus and/or the steam supply apparatus to point the steam directionally towards the coating location.

For example, the steam-generating apparatus and/or the steam supply apparatus can include a steam supply line in the area of the coating apparatus. The line has at least one steam discharge opening facing the coating location.

In accordance to a first design variation, the aforementioned advantages provided by this invention can be realized with a steam-saturated atmosphere which is, by and large, stationary in the spray area, if one ignores the effects of the material web movement, the steam supply effects and any residual spray mist effects.

According to an alternative design variation, it is, however, also possible to obtain these same advantages with a dynamic steam-saturated atmosphere, which is achieved by blowing the steam into the spray area, past the steam-generating apparatus and/or the steam supply apparatus, and then exiting past the spray area. For that purpose, the steam discharge opening that forms the wall sections of the steam supply line, or the wall sections downstream of the steam discharge opening, can be formed nozzle-like, preferably with the smaller nozzle area on the downstream side.

The movement of the steam that is discharged can be affected by appropriate shaping of the outer surfaces of the steam-generating apparatus and/or the steam supply apparatus in such a way that a further smoothing of the coating on the material web can be achieved. For example, the steam-generating apparatus and/or the steam supply apparatus can be designed as a flow restrictor unit in such a way that the steam-saturated atmosphere, which is being discharged in the area adjacent to the coating location, is done so at a fluid velocity that forces at least part of the droplets having formed in the approximate area of the coating location back into the coating. Since the droplets, as well as the coating, are still sufficiently moist in the described area as a result of the steam-saturated atmosphere, the droplets, which are forced back, bleed into the coating without leaving any marks.

In order to guard against any contamination of the coating apparatus as a result of any residual spray mist remaining in the area in spite of the steam-generating apparatus and/or the steam supply apparatus (designed as described herein, a collection device is positioned on the side of the steam-generating apparatus and/or the steam supply apparatus that is facing away from the coating location. This device collects those coating medium droplets and particles which have not been returned to the material web, and/or collects those coating medium droplets and particles that are not adhering to the coating.

Although the droplets of the residual spray mist do not dry as quickly because of the steam-saturated atmosphere, it is appropriate to guard against a "baking" of the coating medium on the splash panel of the collection device. To this end, it is suggested to design a splash panel that includes cooling fins and/or a cooling coil and/or a heat exchanger. Additionally, or alternatively, this splash panel can be equipped with a device to supply a rinsing agent. The collected coating medium and/or the rinsing agent can be removed from the collection device via a discharge line. It is further possible to position a suction apparatus at the side of the steam-generating apparatus and/or the steam supply apparatus that is facing away from the coating location in order to evacuate the steam-saturated atmosphere and/or those coating medium droplets and particles which have not been returned to the material web, and/or to collect those coating medium droplets and particles that are not adhering to the coating. In doing so, the suction apparatus and the aforementioned collection device should be designed as one functional unit.

The steam-generating apparatus and/or the steam supply apparatus described in this application can be applied to an apparatus designed for a one-sided application of the coating medium onto the material web, or it can be applied to an apparatus designed for a two-sided application. In the case of the two-sided application of the coating medium onto the material web, each side of the material web is equipped with a steam-generating apparatus and/or the steam supply apparatus.

In order to combat the adverse effects of film splitting on especially susceptible sections of the material web with a more intense steam treatment, a plurality of steam-generating and/or steam supply sections are positioned in a sequential manner and perpendicular to the material web. These units are capable of being controlled independently from one another, at least in terms of the amount of steam per unit time that is being discharged.

This invention further relates to a process for the application of a liquid or viscid coating medium onto a moving material web, especially one made of paper or cardboard. With 10 respect to the advantages that can be achieved with this coating process, the aforementioned discussion of the coating apparatus applies.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figures 1A, 1B:
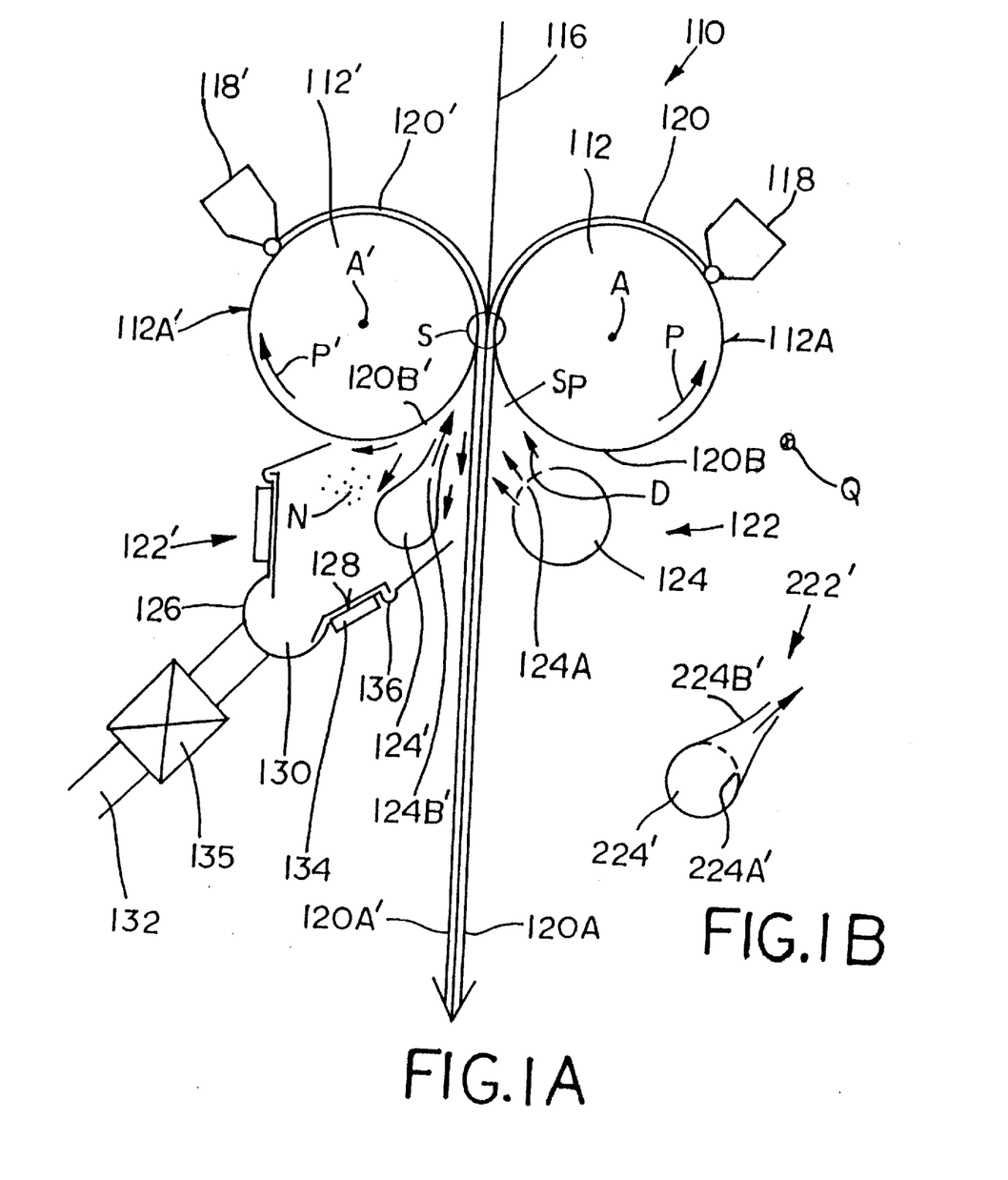
FIG. 1*a* is a side, schematic view of a coating apparatus of the present invention, for the purpose of applying a coating onto a material web; whereby, two embodiments of the steam-generating apparatus and/or the steam supply apparatus are shown on either side of the material web.
FIG. 1*b* is a side, schematic view of another embodiment of the steam-generating apparatus and/or supply apparatus shown on the left side of FIG. 1*a*.

Referring now to the drawings and particularly to FIG. 1, there is a coating apparatus, designed in accordance to this invention, which is labeled with 110. The coating apparatus 110 facilitates the indirect application of liquid or viscid coating medium 120 and 120' onto a material web 116 moving in the direction as indicated by the arrow L. The coating apparatus 110 includes two applicator rolls 112 and 112' which are in contact with the material web 116 in the area of the coating location S, as well as with the coating mechanisms 118, 118', whose purpose is to apply the coating medium 120 and 120' onto the outer surfaces 112a, 112a' of the applicator rolls 112, 112'. The applicator rolls revolve around their respective axes A, A' in opposite rotational direction relative to one another, as indicated by arrows P and P', resulting in the coating medium 120 and 120' being transferred onto the outer surface 112a, 112a' of each roll 112, 112' for subsequent transfer to coating location S. The layers of coating medium being deposited onto material web 116 are labeled with 120 and 120' in FIG. 1a. The remaining coating layer (the result of the film splitting effect) deposited on the outer surfaces 112a and 112a' of the applicator rolls 112, 112' are labeled in FIG. 1a as 120b and 120b'.

A steam-generating apparatus and/or the steam supply apparatus 122 and 122' is provided on each side of the material web 116, and is positioned in the spray or splash area, adjacent to coating location S, on the downstream side relative to the movement L of the material web 116.

The steam-generating apparatus and/or the steam supply apparatus 122 shown on the right side of FIG. 1a includes a steam supply line 124 positioned directionally perpendicular Q to the material web 116. This line includes a plurality of openings 124a—facing the spray area—through which steam D, supplied through line 124, can exit without directional guidance, as indicated by the three small arrows in FIG. 1a. With this design, the quantity of steam provided via the steam supply line 124 to the spray area Sp is equivalent to the amount of steam that subsequently escapes from the spray area Sp due to the movement of the material web 116, the rotation of the applicator roll 112, and other effects.

In contrast to the design described above, the steam-generating apparatus and/or the steam supply apparatus shown on the left side of FIG. 1a uses excess steam, provided via the steam supply line 124' and expelled into the spray through a nozzle-shaped steam exit slot 124b', so that a flow of steam exits the spray area Sp, as indicated in FIG. 1a by the two arrows on each side of the slot-type nozzle 124b', even when the material web 116 and applicator roll 112' are stationary. Furthermore, the outer surface of the steam supply line 124' and slot-type nozzle 124b' are shaped in a way that forces spray mist droplets that might develop between the stated outer surfaces and the material web 116 right back to the coating layer 120a'.

In the design according to FIG. 1a, the walls of the supply line 124' and the slot-type nozzle 124b' are a one-piece design. According to the alternative shown in FIG. 1b, a steam-generating apparatus and/or the steam supply apparatus 222' includes a slot-type nozzle body 224b', fitted on steam supply pipe 224', which is provided with steam discharge openings 224a'. Nozzle body 224b' is glued, soldered, welded or otherwise fastened to the pipe 224' in a leak proof manner. This last mentioned method of attachment allows a lateral movement and a turning of the nozzle, as well as an adjustment of the gap width of the nozzle.

In order to avoid any residual spray mist N that might develop to deposit on coating layer 120a', a collection device 126 is positioned adjacent to coating location S on the downstream side relative to the movement L of the material web, behind the steam-generating apparatus and/or the steam supply apparatus 122'. Collection device 126 includes a splash panel 128 whose end that is facing the material web 116 is also pointing in the opposite direction with respect to the feed direction and is positioned in a way that allows a gap of approximately 5 mm to 50 mm, preferably 30 mm, between the material web 16 and the edge of the splash panel 128. At the lower part of the collection device 126 there is a collector 130, or more precisely, a collector duct in which the coating medium that drains off of the splash panel 128 collects prior to it being discharged via drain line 132 into either a waste container for subsequent disposal, or into a coating medium reservoir for later use. In order to enhance the discharge effectiveness, it is possible to connect a source of sub-atmospheric pressure source 135 to drain line 132, which, if sized appropriately, can also function as a suction apparatus for the purpose of eliminating any residual spray mist. With the aid of a separator (not shown), the individual (spray) components, which are drawn from the collection device 126, can be separated from one another and re-used.

Since the coating medium 120' has a temperature of typically in the range of 30 to 60 degrees C., there is a danger that collection device 126 also warms up during operation, resulting in a condition that allows the coating medium 120' to dry on splash panel 128, causing a build-up of coating residue which is commonly referred to as "baking". This layer of residue must be removed from time to time. In order to facilitate a substantially maintenance-free operation of the collection device, cooling fins 134 are attached to the outside of splash panel 128, the side facing away from the coating location S. These cooling fins 134 result in an improvement in heat transfer between the collection device 126 and the surrounding air. As a result of this cooling effect, the drying of the coating medium 120 after its deposit onto the splash panel 128 is sufficiently delayed so that the coating medium runs off the splash panel 128 without leaving any significant residue. In addition, a rinsing agent, preferably water, can be supplied through line 136 onto splash panel 128 to rinse off coating medium 120 into collector duct 130.

Collection device 126 can be made simply and cost-effectively, for example, as a sheet metal construction.

Although the above-described invention is elaborated by using steam as the fluid of choice, it should, at this point, be clearly stated that any kind of fluid can be used that has the capability to reduce the surface tension of the coating medium. The fluid can guard against the quick drying of the coating medium or eliminate the formation of the coating medium spray mist, or more precisely, guard against the disadvantageous effects of the spray mist on the coating quality. It is possible, for example, to use alcohol as a fluid. Additionally, the effect of the fluid on the formation of the spray mist can be further enhanced by choosing the appropriate proper temperature of the fluid. Depending on the type of fluid, optimum fluid temperatures could be higher or lower.

Several other design alternatives of the above-mentioned collection device will be discussed in the section below:

The core idea of a simple, cost-effective collection device is the splash panel. A splash panel is positioned with one of its ends adjacent to the material web and pointing in opposite direction relative to the feed direction. This allows the momentum of the coating particles to be reduced as they impact the splash panel, thereby minimizing the possibility of the droplets bouncing back from the splash panel. In order to increase the effectiveness of absorbing the particles, it is naturally desirable to position the collection device as closely as possible to the material web. However, there must be a minimum safety distance maintained between the collection device and the material web, especially in light of the possibility of a fluttering material web, or a tear-related wind-up condition of the material web around a counter roll positioned in the area of the coating location. As a good compromise between these two opposing design considerations, it is suggested that the end of the splash panel facing the material web be positioned at a distance of 5 mm to 10 mm from the material web.

In order to avoid the captured coating medium drying on the splash panel causing a fouling condition, there are provisions for the splash panel to be equipped with cooling elements such as cooling fins, preferably on the side of the splash panel facing away from the coating location. In addition to "passive" cooling fins, designs can also encompass "active" cooling elements, i.e., a cooling circuit through which cooling fluid flows. As a result of the cooling effect, the coating medium runs off the splash panel without leaving any significant amount of residue, resulting in a collection device that can be operated substantially maintenance-free over an extended time period.

A well-designed collection device is equipped with a collector duct at the bottom to collect the coating medium particles. Additionally, or alternatively, the collection device can also be equipped with a discharge system at its bottom for easy disposal of the collected coating medium. To enhance the drainage effectiveness, a source of sub-atmospheric pressure can be connected to the discharge system.

A collection device positioned below the material web can—beyond the advantageous effects of the uniformity of the coating—also contribute to the cleanliness of the entire coating apparatus, since the coating medium that is being discharged at the bottom of the collection device can be captured.

In cases where the coating medium is applied onto both sides of the material web, especially when the material web runs vertically in the area of the coating location, a collection device is positioned on each side of the material web.

A design of the collection device which utilizes sheet metal construction proves to be especially cost-effective and simple to manufacture. Fundamentally, the collection device can also be made of synthetic or other suitable materials.

Further, it is possible to position a suction apparatus adjacent to the coating location, on the downstream side relative to the movement of the material web, in order to evacuate the coating medium droplets and particles which have not been returned to the material web. Also, those coating medium droplets and particles that are not adhering to the coating can be collected. The suction apparatus can include, for example, a discharge line and an air suction ventilator positioned in the discharge line, with the inlet opening to the discharge line being adjacent to the material web. The airflow, generated by the air suction ventilator and directed towards the inlet opening, yields a highly efficient method of collecting the coating particles of the spray mist.

An especially high collection efficiency can be achieved if there is a collection device ahead of the suction apparatus as explained above.

Figure 3:
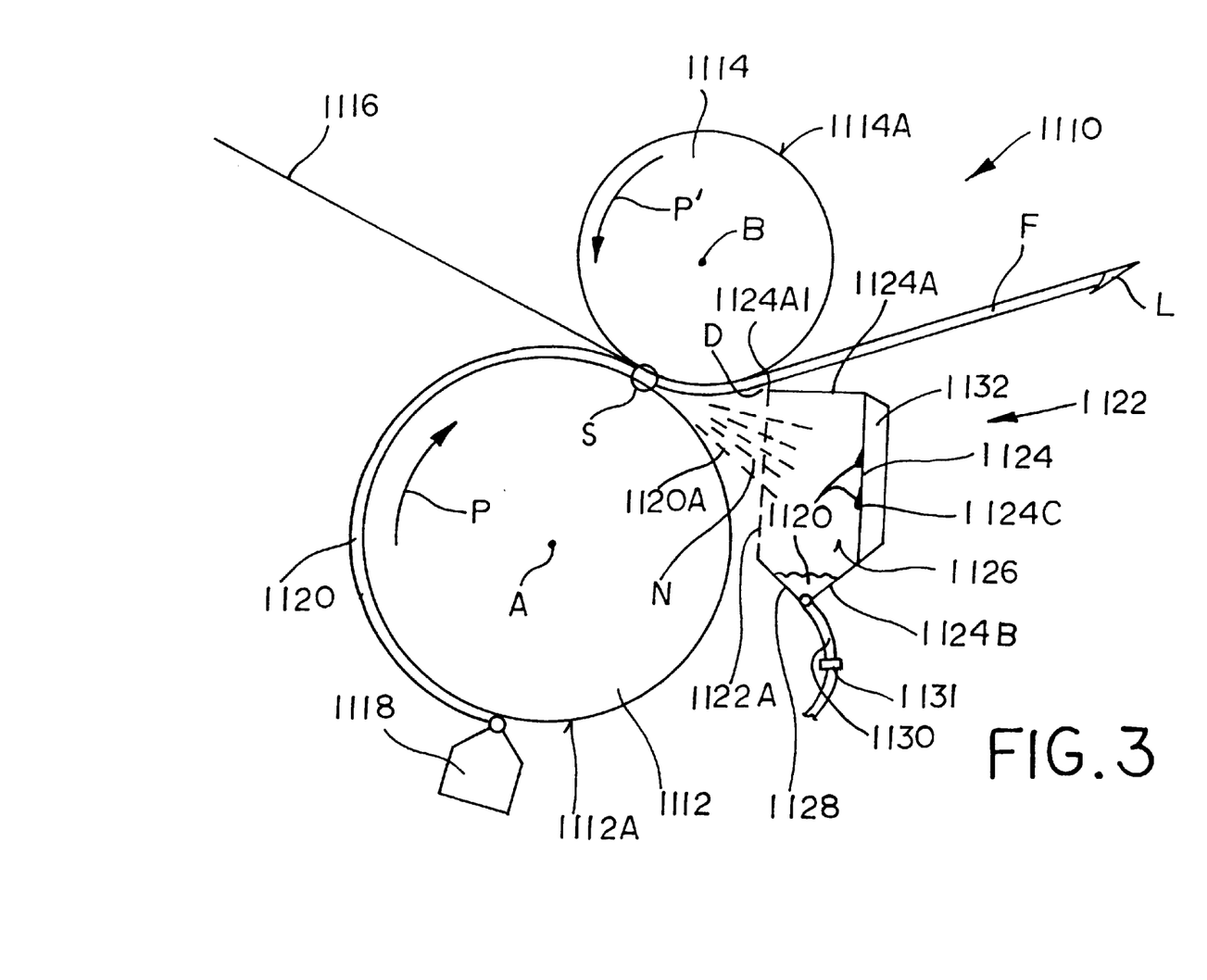
FIG. 3 is an approximate schematic, side view of another embodiment of a coating apparatus of the present invention including a collection device.

FIG. 3 depicts a coating apparatus, which is labeled with 1110. The coating apparatus 1110 facilitates the indirect application of liquid and viscid coating medium 1120 onto a material web 1116 moving in the direction as indicated by arrow L. The coating apparatus 1110 includes an applicator roll 1112, which is in contact with the material web 1116 in the area of the coating location S, as well as with the coating mechanism 1118, whose purpose is to apply the coating medium 1120 onto the surface 1112a of the applicator roll 1112. The applicator roll 1112 revolves around its axis A, resulting in the coating medium 1120 being transported from the coating mechanism 1118 to the coating location S.

Material web 1116 is wrapped around counter roll 1114 in the area of the coating location S. Counter roll 1114 runs in opposite rotational direction relative to roll 1112 as indicated by arrows P'. Rolls 1112 and 1114 are driven in a manner so that their respective outer surfaces 1112a and 1114a run relatively slip-free in the area of contact with the material web 1116. The coating medium deposited onto the material web 1116 is labeled as F in FIG. 3.

Especially at high running speeds of the material web 1116, a spray mist N is likely to develop downstream of the coating location S, especially in the area where the material web 1116 lifts off the outer surface 1112a of roll 1112. The coating medium particles 1120a that form spray mist N can either be liquid or viscid particles from the coating medium 1120, or can be particles that have already dried.

In order to avoid the coating medium particles 1120a of the spray mist N being re-deposited onto the coating F, a collection device 1122 is positioned adjacent to coating location S, on the downstream side relative to the movement L of the material web. Collection device 1122 includes a splash panel 1124 with one of its ends 1124a being adjacent to the material web 1116 and the other end 1124b being removed from the material web. Collection device 1122 also includes side panels 1126, of which only one is shown in the approximate schematic of FIG. 3. Collection device 1122 is designed in the form of a sheet metal construction.

In the exemplification represented in FIG. 3, the splash panel 1124 is shaped and connected to side panels 1126 in a way that places the collection device 1122 like an open box, with the opening in the area of 1122a pointing in the opposite direction relative to the feed direction L. The upper paneling of collection device 1122, which is formed by the upper end 1124a of splash panel 1124, runs against the feed direction L towards the material web 1116 so that its outer-most edge 1124a1 is positioned approximately 5 to 10 mm from the material web 1116. The lower paneling of collection device 1122, which is formed by the lower end 1124b of splash panel 1124, as shown in the attached exemplification, is shaped in form of a collector 1128 in which the coating medium 1120 that runs off back panel 1124c is collected prior to its discharge through drain line 1130, either into a waste container for later disposal or into a coating medium reservoir for future use. A sub-atmospheric pressure source 1131 can be attached to the drain line 1130 to enhance the discharge-effectiveness.

Since the coating medium 1120 is typically at a temperature of approximately 50 degrees to 60 degrees C., there is the danger that the collection device 1122 also heats up to this temperature level during operation of the coating apparatus 1110. In this case, the solvent contained in the coating medium 1120, i.e., water, would quickly evaporate upon contacting the splash panel 1124 and, therefore, would "bake" the coating medium 1120 onto the splash panel 1124. A layer of residue would rapidly form on splash panel 1124, which must be removed from time to time. In order to facilitate a substantially maintenance-free operation of the collection device 1122, cooling fins 1132 are attached to the outside of splash panel 1124, the side facing away from the coating location S. These cooling fins 1132 result in an improvement in heat transfer between the collection device 1122 and the surrounding air. As a result of the cooling effect brought about by the cooling fins 1132, the evaporation of the solvent in the coating medium 1120 upon contact with the splash panel 1124 is sufficiently delayed so that the coating medium runs off the splash panel 1124 and into the collector 1128 without leaving any significant residue.

It should be noted here that the upper end 1124a, the lower end 1124b and the back panel 1124c of the splash panel 1124 can be designed as separate box-type elements. It is also possible, that all components of the duct are designed as one monolithic piece. It should be further noted that the cooling fins 1132 attached to the collection device 1122 can be substituted by cooling coils through which cooling fluid circulates.

Figure 4:
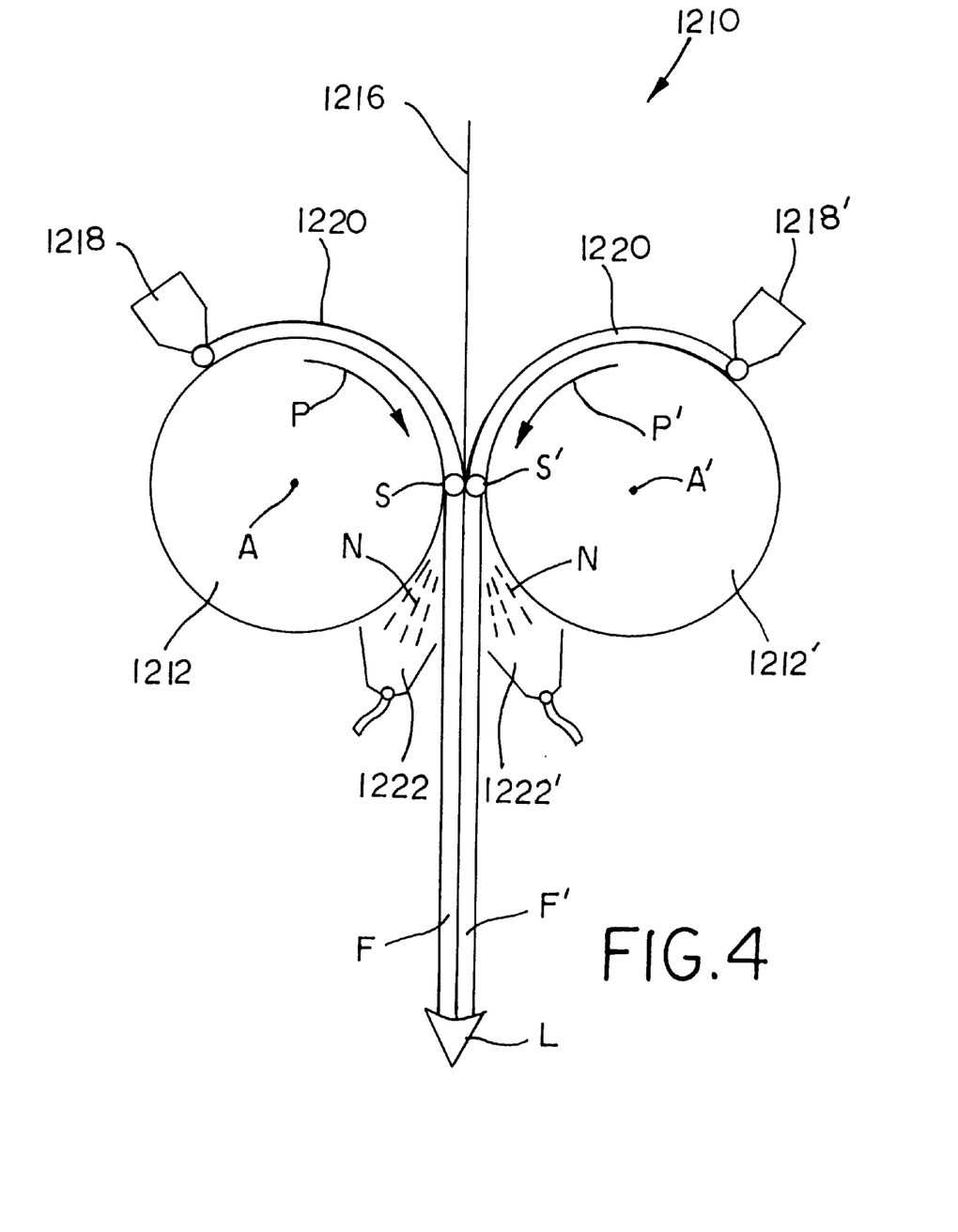
FIG. 4 is an approximate schematic, side view of another embodiment of an apparatus designed to coat a material web on both sides of a material web, including collection devices positioned on either side of the material web.

FIG. 4 illustrates a coating apparatus 1210, designed to apply coating medium 1220 on both sides of the material web 1216 moving in the direction L. The coating apparatus 1210 includes two coating mechanisms 1218 and 1218'. Additionally, there are two applicator rolls 1212 and 1212' which revolve around their respective axes A, A' in opposite rotational direction relative to one another (indicated by arrows P and P'), resulting in the coating medium 1220 being transported from the coating mechanisms 1218, 1218' to the material web 1216. A spray mist N develops on both sides of the material web 1216, adjacent to coating locations S and S', on the downstream side relative to the movement L of the material web 1216. This spray mist N is captured by the collection devices 1222 and 1222' for the purpose of avoiding its deposit on the layers of coating F and F' on the material web 1216, and, therefore, adversely affecting its quality. With respect to the construction of the collection devices 1222 and 1222', reference is made to the elaboration of the collection device 1122 shown in FIG. 3.

Figure 5:
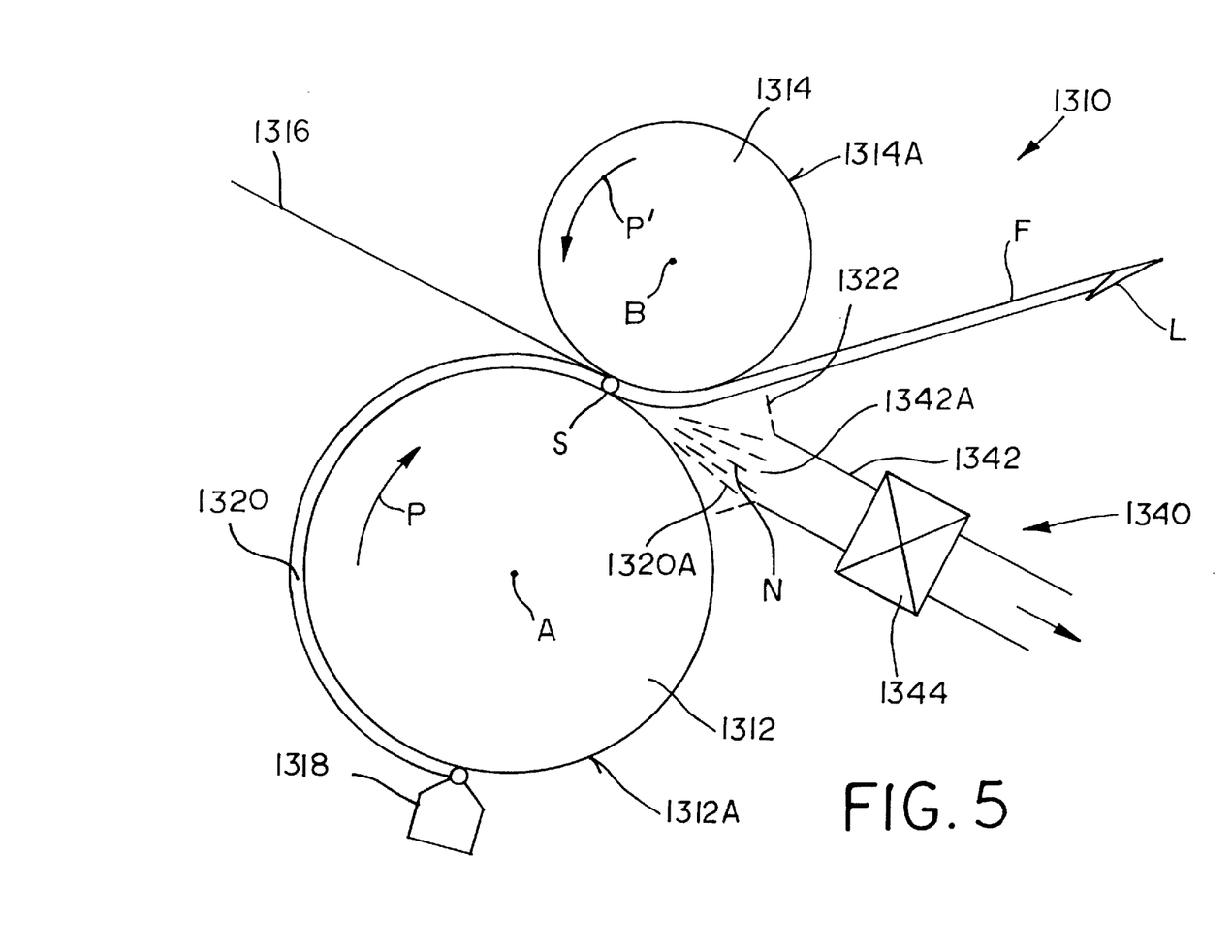
FIG. 5 is an approximate schematic, side view of yet another embodiment of a coating apparatus of the present invention including a suction apparatus.

FIG. 5 shows an additional embodiment of a coating apparatus. The coating apparatus 1310 includes an applicator 1318, whose function is to apply the coating medium 1320 onto the outer surface 1312*a* of applicator roll 1312. The applicator roll 1312 revolves around its axis A, as indicated by arrow P, resulting in the coating medium 1320 being transported from coating mechanism 1318 to coating location S, where it is deposited onto a moving material web 1316, moving in the direction as indicated by arrow L.

Material web 1316 is wrapped around counter roll 1314 in the area of the coating location. Counter roll 1314 revolves around its axis B in opposite direction relative to applicator roll 1312, as indicated by arrow P'.

A spray mist N forms from coating material 1320 and develops adjacent to coating location S on the downstream side relative to the movement L of the material web. In order to avoid the spray mist N depositing on the coating layer of material web 1316, coating apparatus 1310 is equipped with a suction apparatus 1340, as shown in FIG. 5. The suction apparatus 1340 includes a discharge line 1342 whose opening 1342*a* is adjacent to and faces coating location S. The suction line 1342 is equipped with a air suction ventilator 1344, which generates a suction in the area of the inlet opening 1342*a*. This results in the coating medium particles 1320*a* of the spray mist N being evacuated, similar to the vacuum cleaner principle, so that none of these particles can reach the coating layer F.

As indicated in FIG. 5 by the dashed line, the inlet opening 1342*a* can also incorporate a collection device 1322, whose advantages have been explained above by the exemplification represented in FIG. 3. By using an air suction ventilator 1344 which offers sufficient power, the spray duct system 1322 could be eliminated.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of applying a coating medium onto a moving fiber material web, comprising the steps of:

applying the coating medium onto an applicator element with a coating mechanism;

subsequently transferring a coating layer of the coating medium from said applicator element to the fiber web at a coating location;

providing a doctoring device, said doctoring device being disposed adjacent to the fiber web at a doctor station adjacent to and after said coating location relative to a direction of movement of the fiber web;

at least one of smoothing and metering the coating with said doctoring device; and at least one of generating and supplying steam with a steam device, said steam device being disposed adjacent to the fiber web and adjacent to and after one of said coating location and said doctor station relative to the direction of movement of the fiber web.

2. The method of claim 1, comprising the further step of directing the steam toward one of the coating location and said doctor station.

3. The method of claim 1, comprising the further step of providing the steam through a steam supply line, said steam supply line including at least one steam discharge opening directed toward one of said coating location and said doctor station.

4. The method of claim 1, comprising the further step of providing a spray area after said applicator element such that: droplets and particles of coating medium form adjacent to one of said coating location and said doctor station; and a steam-saturated atmosphere exits said spray area at a velocity that forces at least a portion of said droplets and said particles of coating medium back into the coating layer on the fiber web.

5. A method of applying a coating medium onto a moving fiber material web, comprising the steps of:

applying the coating medium onto an applicator element with a coating mechanism;

subsequently transferring a coating layer of the coating medium from said applicator element to the fiber web at a coating location;

providing a doctoring device, said doctoring device being a disposed adjacent to the fiber web at a doctor station adjacent to and after said coating location relative to a direction of movement of the fiber web;

at least one of smoothing and metering the coating with said doctoring device;

at least one of generating and supplying steam with a steam device, said steam device being disposed adjacent to the fiber web and adjacent to and after one of said coating location and said doctor station relative to the direction of movement of the fiber web; and using a collection device to collect droplets and particles of coating medium that adhere to neither of the fiber web and the coating, said collection device being located after said one of said coating location and said doctor station and behind said steam device relative to the direction of movement of the fiber web.

6. The method of claim 5, comprising the further steps of:

providing the collection device with a splash panel; and cooling said splash panel.

7. The method of claim 5, comprising the further steps of:

providing the collection device with a splash panel; and rinsing off said splash panel with a fluid.

8. The method of claim 5, comprising the further step of using a suction apparatus to evacuate at least one of:
- a fluid-saturated atmosphere; and
- droplets and particles of coating medium that adhere to neither of the fiber web and the coating, said suction apparatus being in fluid communication with said collection device.

9. The method of claim 1, comprising the further steps of:
- providing a plurality of sections substantially aligned in a direction substantially perpendicular to the fiber web;
- using said sections to supply the fiber web with fluid; and
- independently controlling a rate of fluid supplied by each of said sections.

10. A method of applying a coating medium onto a moving fiber material web, comprising the steps of:
- applying the coating medium onto an applicator element with a coating mechanism;
- providing a coating sump defined between a limiting element and the fiber web;
- subsequently entering the coating medium into said coating sump;
- depositing the coating medium onto the fiber web in said coating sump;
- providing a doctoring device, said doctoring device being disposed adjacent to the fiber web and at a doctor station adjacent to and after a coating location relative to a direction of movement of the fiber web;
- at least one of smoothing and metering the coating with said doctoring device; and
- at least one of generating and supplying steam with a steam device, said steam device being disposed adjacent to the fiber web and adjacent to and after one of said coating location and said doctor station relative to the direction of movement of the fiber web.

* * * * *

UNITED STATES PATENT AND TRADEMARK OFFICE
CERTIFICATE OF CORRECTION

PATENT NO.   : 6,171,653 B1
DATED        : January 9, 2001
INVENTOR(S)  : Bernhard Kohl et al.

It is certified that error appears in the above-identified patent and that said Letters Patent is hereby corrected as shown below:

Title page,
Under "REFERENCES CITED", line 3, delete "10/1995" and substitute -- 12/1996 -- therefor.

Column 4,
Line 16, after "with" delete "10" therefor.

Column 10,
Line 44, before "disposed" delete "a" therefor.

Signed and Sealed this

Eighteenth Day of December, 2001

Attest:

JAMES E. ROGAN
Attesting Officer
Director of the United States Patent and Trademark Office